(12) United States Patent
Ding et al.

(10) Patent No.: US 9,506,770 B2
(45) Date of Patent: *Nov. 29, 2016

(54) CANDIDATE PATH RECOMMENDATION

(71) Applicant: International Business Machines Corporation, Armonk, NY (US)

(72) Inventors: Jian Dong Ding, Shanghai (CN); Ning Duan, Beijing (CN); Peng Ji, Shanghai (CN); Qian Kun Zhao, Shanghai (CN); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,954

(22) Filed: Apr. 20, 2015

(65) Prior Publication Data
US 2015/0308845 A1 Oct. 29, 2015

(30) Foreign Application Priority Data

Apr. 25, 2014 (CN) .......................... 2014 1 0171830

(51) Int. Cl.
  G01C 21/12 (2006.01)
  G01C 21/34 (2006.01)
  G06F 17/30 (2006.01)
  H04L 29/08 (2006.01)

(52) U.S. Cl.
  CPC ....... G01C 21/3484 (2013.01); G01C 21/3492 (2013.01); G06F 17/3053 (2013.01); G06F 17/30061 (2013.01); G06F 17/30598 (2013.01); H04L 67/306 (2013.01)

(58) Field of Classification Search
  CPC ... G01C 21/34; G01C 21/3484; G06F 17/30; G06F 17/30598
  USPC ................ 701/410, 411, 414, 416, 423–425, 701/117–119
  See application file for complete search history.

(56) References Cited

U.S. PATENT DOCUMENTS 8,427,341 B2    4/2013  Yulevich
8,738,285 B2 *  5/2014  Scofield ............. G01C 21/3492
                                              340/995.13

(Continued)

FOREIGN PATENT DOCUMENTS

WO    2008068090 A1    6/2008

OTHER PUBLICATIONS

U.S. Appl. No. 14/745,919, filed Jun. 22, 2015.

(Continued)

*Primary Examiner* — Thomas G Black
*Assistant Examiner* — Luke Huynh
(74) *Attorney, Agent, or Firm* — Cantor Colburn LLP; Keivan Razavi

(57) ABSTRACT

A method for recommending a candidate path includes, in response to receiving a query from a user, looking up a plurality of paths that conform to the query; with respect to a current path among the plurality of paths, obtaining behavior data of the user and behavior data of at least one other user associated with the current path; determining a recommendation indicator associated with the current path, based on the behavior data of the user and the behavior data of the at least one other user; and recommending the candidate path to the user based on at least a recommendation indicator associated with at least one of the plurality of paths.

9 Claims, 7 Drawing Sheets

(56) References Cited

U.S. PATENT DOCUMENTS

| | | | |
|---|---|---|---|
| 2004/0015291 A1* | 1/2004 | Petzold | G01C 21/3484 701/424 |
| 2007/0299599 A1* | 12/2007 | Letchner | G01C 21/3484 701/424 |
| 2010/0042314 A1 | 2/2010 | Vogt et al. | |
| 2011/0320113 A1 | 12/2011 | Tate, Jr. | |
| 2012/0280835 A1 | 11/2012 | Raz et al. | |
| 2013/0345961 A1* | 12/2013 | Leader | G01C 21/3617 701/410 |
| 2014/0005924 A1* | 1/2014 | Letz | G01C 21/343 701/424 |
| 2014/0032109 A1* | 1/2014 | Hsieh | G01C 21/34 701/533 |

OTHER PUBLICATIONS

Disclosed Anonymously (IP.com), "Automatic Destination Prediction after Route Disruption," IP.com, IPCOM000214456, Jan. 30, 2012, pp. 1-3.

Disclosed Anonymously (IP.com), "System and Methodology for deriving travel routes based on driving style(s)," IP.com, IPCOM000211541, Oct. 11, 2011, pp. 1-2.

IBM, "Real Time Route Update in Navigation Systems Using Vehicle and Driver Data," IP.com, IPCOM000181701D, Apr. 9, 2009, pp. 1-4.

Jian Dong Ding, et al.,"Candidate Path Recommendation," U.S Appl. No. 14/745,919, filed Jun. 22, 2015.

List of IBM Patents or Patent Applications Treated as Related; CN920140033US1, Date File: Apr. 20, 2015, pp. 1-2.

* cited by examiner

200

| |
|---|
| 210 Starting Point:      220 Destination: |
| the Forbidden City           the Summer Palace |
| |
| 230 Search Result |
| |
| 232 By Distance: |
| Path 1: ... |
| Path 2: ... |
| |
| 234 By Time: |
| Path 3: ... |
| Path 4: ... |

Fig. 2

CANDIDATE PATH RECOMMENDATION

FOREIGN PRIORITY

This application claims priority to Chinese Patent Application No. 201410171830.0, filed Apr. 25, 2014, and all the benefits accruing therefrom under 35 U.S.C. §119, the contents of which in its entirety are herein incorporated by reference.

BACKGROUND

Various embodiments of the present invention relate to path recommendation, and more specifically, to a method and apparatus for recommending a candidate path based on user behavior data.

With the development of computer technology and positioning technology, various path navigation devices have been developed so far. For example, a user (a vehicle driver) can query a navigation path from a given starting point to a certain destination by an onboard device or a portable navigation device. Using existing navigation devices, a plurality of candidate navigation paths will be returned.

Generally the navigation device may rank a plurality of navigation paths based on standards like distance, time and so on. However, due to differences in respect of users' driving habits and skills, navigation paths recommended to a user by the navigation device is not necessarily suitable for the user's own characteristics and thus might cause inconvenience to the user. For example, suppose the user is a novice driver and has quite limited driving experience, if a highway is recommended as a preferred path by the navigation device to the user, then the user perhaps does not want to choose the highway but prefers an ordinary road where the speed is rather low. At this point, it becomes a current research focus regarding how to recommend, based on a user's own characteristics, a candidate path that better conforms to these characteristics.

SUMMARY

In one embodiment, a method for recommending a candidate path includes in response to receiving a query from a user, looking up, with a processor, a plurality of paths that conform to the query; with respect to a current path among the plurality of paths, obtaining behavior data of the user and behavior data of at least one other user associated with the current path; determining a recommendation indicator associated with the current path, based on the behavior data of the user and the behavior data of the at least one other user; and recommending the candidate path to the user based on at least a recommendation indicator associated with at least one of the plurality of paths.

In another embodiment, an apparatus for recommending a candidate path includes a lookup module configured to, in response to receiving a query from a user, look up a plurality of paths that conform to the query; an obtaining module configured to, with respect to a current path among the plurality of paths, obtain behavior data of the user and behavior data of at least one other user associated with the current path; a determining module configured to determine a recommendation indicator associated with the current path, based on the behavior data of the user and the behavior data of the at least one other user; and a recommending module configured to recommend the candidate path to the user based on at least a recommendation indicator associated with at least one of the plurality of paths.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 2 shows a schematic view of a user interface for obtaining candidate paths according to one technical solution;

DETAILED DESCRIPTION

In view of the above, it is desired to develop a technical solution capable of recommending a candidate path based on characteristics of a user, and it is desired the technical solution can be compatible with an existing navigation technical solution, so as to recommend the candidate path based on the user's characteristics and information of other user having the similar characteristics with the user, without changing the existing path navigation technical solution as much as possible.

According to one aspect of the present invention, there is provided a method for recommending a candidate path, comprising: in response to receiving a query from a user, looking up a plurality of paths that conform to the query; with respect to a current path among the plurality of paths, obtaining behavior data of the user and behavior data of at least one other user associated with the current path; determining a recommendation indicator associated with the current path, based on the behavior data of the user and the behavior data of the at least one other user; and recommending the candidate path to the user based on at least a recommendation indicator associated with at least one of the plurality of paths.

According to one aspect of the present invention, there is provided an apparatus for recommending a candidate path, comprising: a lookup module configured to, in response to receiving a query from a user, look up a plurality of paths that conform to the query; an obtaining module configured to, with respect to a current path among the plurality of paths, obtain behavior data of the user and behavior data of at least one other user associated with the current path; a determining module configured to determine a recommendation indicator associated with the current path, based on the behavior data of the user and the behavior data of the at least one other user; and a recommending module configured to recommend the candidate path to the user based on at least a recommendation indicator associated with at least one of the plurality of paths.

With respect to a plurality of paths obtained based on the existing path navigation technique, the method and apparatus of the present invention can determine a recommendation indicator with respect to each path based on the user's own characteristics, and further re-rank the plurality of navigation paths so as to recommend to the user one that is suitable to the user's own characteristics.

Some embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
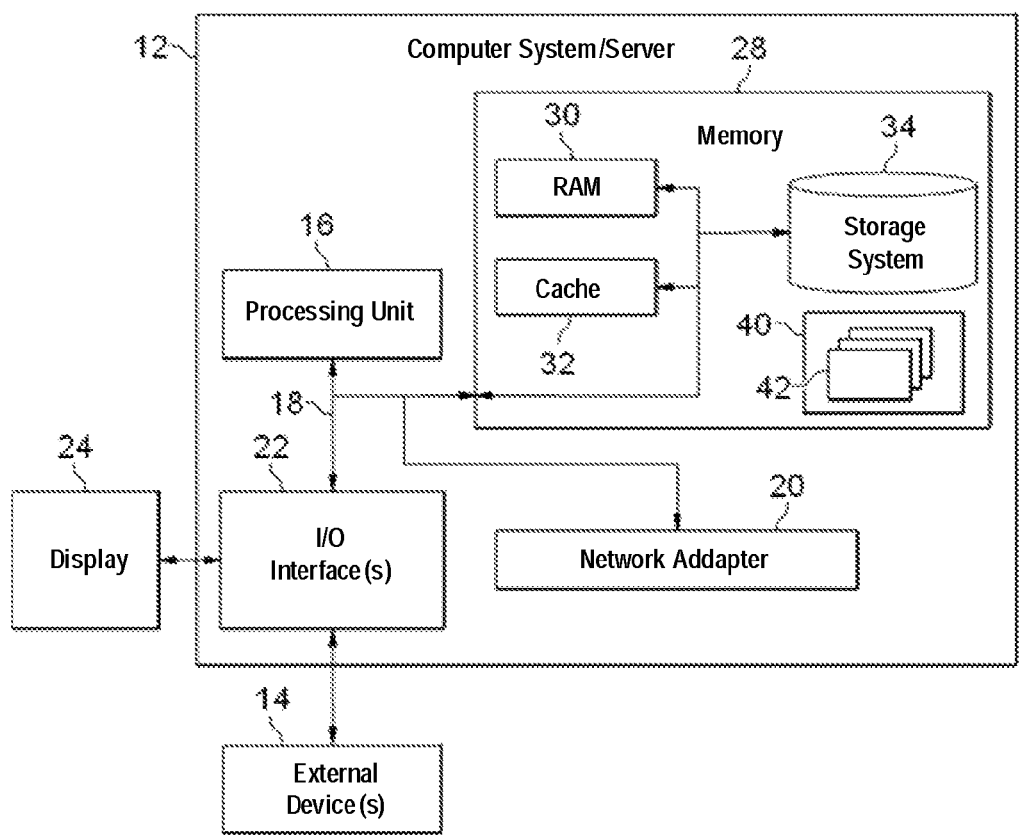
FIG. 1 schematically shows an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 2 shows a schematic view 200 of a user interface for obtaining candidate paths according to one technical solution. As shown in FIG. 2, suppose the user wants to search for navigation paths from a starting point 210 "the Forbidden City" to a destination 220 "the Summer Palace." Existing technical solutions usually provide an interface as shown in FIG. 2. In a search result 230, a plurality of search results may be returned according to various search standards (e.g., by distance, by time, etc.). Specifically, when by distance 232 is the search standard, a path 1, a path 2, . . . may be returned; when by time 234 is the search standard, a path 3, a path 4, . . . may be returned.

As shown in FIG. 2, although the existing path navigation tool can rank a plurality of candidate paths according to a specified standard, this technical solution fails to consider the user's own behavior data but ranks based on a fixed search standard only.

For example, there might exist a situation where a certain candidate path is rather bumpy and thereby a driver has to frequently speed up or slow down when driving on the path. However, according to the existing technical solution of distance-based ranking, it is possible that the path has a shortest distance and thus is recommended as a preference. Since user experience of driving on the path is not good, when the user chooses the path, he/she perhaps is not satisfactory with such a recommendation result. Therefore, it is desired to recommend to a user a path that better conforms to the user's driving habits and driving experience, based on the user's behavior data.

Figure 3:
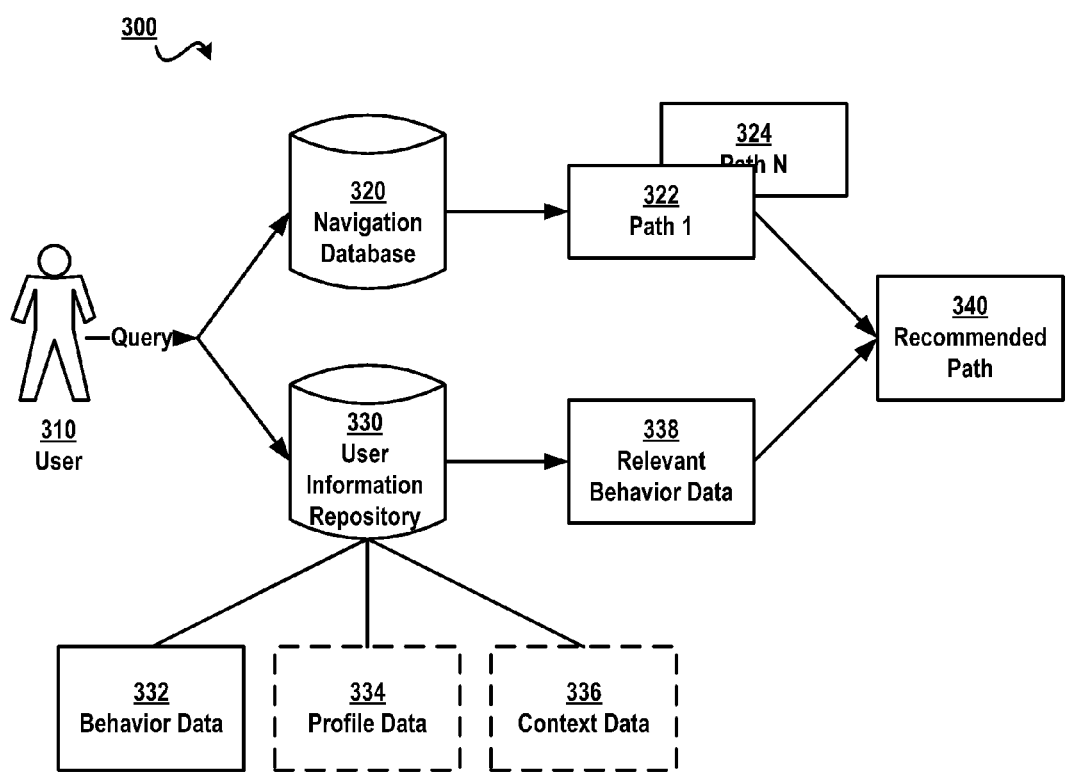
FIG. 3 schematically shows an architecture diagram of a technical solution for recommending a candidate path based on the behavior data of a user according to one embodiment of the present invention.

FIG. 3 schematically shows an architecture diagram 300 of a technical solution for recommending a candidate path based on user behavior data according to one embodiment of the present invention. In the context of the present invention, the user behavior data may refer to the user's historical behavior in the past driving. The behavior data may for example comprise a plurality of respects, such as speedup information, slowdown information, overspeed information, engine over rotation, etc.

As shown in FIG. 3, in the embodiments of the present invention, a user 310 is a user who is executing a query. In response to receiving a query from user 310, navigation paths (e.g., a path 1 322, . . . , a path N 324) conforming to the query condition may be looked up in a navigation database 320; associated behavior data 338 associated with at least one part of users may further be obtained from a user information repository 330 storing user information. Note user information repository 330 here may store collected information of multiple users, for example, may include information on the user who is executing a query, and further may include information on other users. Note behavior data stored in user information repository 330 may further include on which road segments these users once drive, for example, record on which segment the user's certain behavior is exhibited.

In one embodiment of the present invention, user information repository 330 may include behavior data 332; here the behavior data is, for example, data extracted from real-time data of a vehicle. For example, a vehicle's current driving speed, location and direction may be collected by the vehicle's bus interface or a sensor mounted on the vehicle; subsequently, the vehicle's driver (user) behavior data like speedup and slowdown may be extracted from collected data. In addition, as shown by dashed boxes in FIG. 3, user information repository 330 may further include profile data 334 and context data 336. Profile data 334 may be used for describing users' basic information, such as gender, age, driving years, education level, job, etc.; and context data 336 may be used for describing ambient environmental situation of a current user, such as time information, road information, traffic information, weather information, type of vehicle, etc.

In one embodiment of the present invention, when a query is received from a user, other users who once drive on path 1 322, . . . , path N 324 may be searched for in user information repository 330, and a candidate path 340 is recommended to the user based on behavior data of the other users. Further, in another embodiment of the present invention, to make the recommendation result better conform to the user's characteristics, other users who once drive on path 1 322, . . . , path N 324 and who have the similar context data and/or profile data to the user may be searched for in user information repository 330, so as to recommend candidate path 340 to the user based on behavior data of these similar other users.

Those skilled in the art may understand the user behavior may be measured in various respects. For example, the behavior data at least includes at least one of: speedup information, slowdown information, overspeed information, and engine over rotation, etc. In the context of the present invention, the behavior data may be presented in a multi-dimensional form. Suppose K behaviors have been collected currently, then the behavior data may be represented as a K-dimensional vector $(d_1, d_2, \ldots, d_k, \ldots, d_K)$.

Based on the above-described architecture, the present invention provides a method for recommending a candidate path, the method comprising: in response to receiving a query from a user, looking up a plurality of paths that conform to the query; with respect to a current path among the plurality of paths, obtaining behavior data of the user and behavior data of at least one other user associated with the current path; determining a recommendation indicator associated with the current path, based on the behavior data of the user and the behavior data of the at least one other user; and recommending the candidate path to the user based on at least a recommendation indicator associated with at least one of the plurality of paths.

Figure 4:
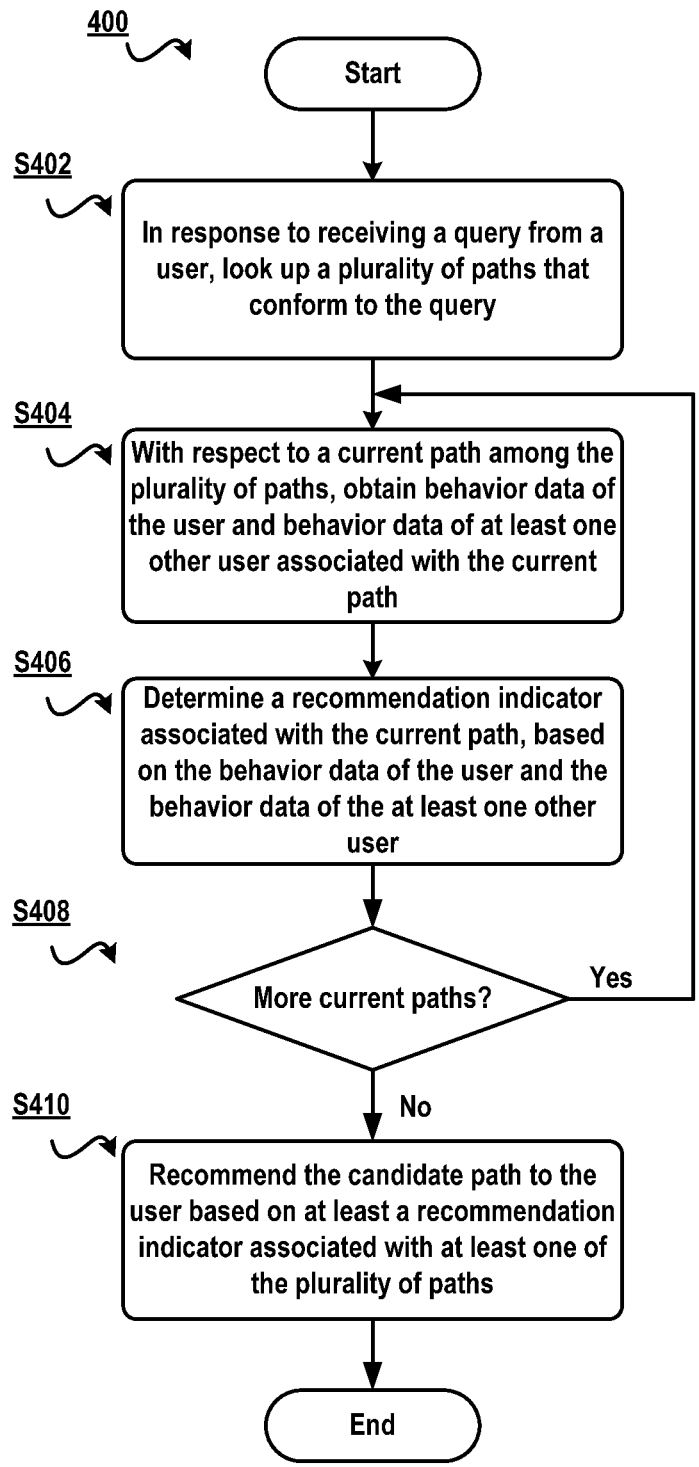
FIG. 4 schematically shows a flowchart of a method for recommending a candidate path based on the behavior data of a user according to one embodiment of the present invention.

With reference to FIG. 4, detailed description is presented below to details of the present invention. FIG. 4 shows a flowchart 400 of a method for recommending a candidate path based on user behavior data according to one embodiment of the present invention. Specifically, in operation S402 in response to receiving a query from a user, a plurality of paths conforming to the query are looked up. In the context of the present invention, it is not intended to limit how the plurality of paths conforming to the query are obtained. For example, those skilled in the art may use a known path navigation method as shown with reference to FIG. 2, to obtain a plurality of candidate navigation paths from the starting point "the Forbidden City" to the destination "the Summer Palace". In addition, those skilled in the art may user various path navigation methods that will be developed in future, to obtain candidate navigation paths. According to the method to be described with reference to operations S404 to S410, the plurality of paths found in operation S402 may be ranked, and further a path that best conforms to the user's characteristics is recommended as a preference to the user.

In operation S404, with respect to a current path among the plurality of paths, behavior data of the user and behavior data of at least one other user associated with the current path are obtained. It is currently unclear what behavior will occur when the user executing the query drives on the plurality of candidate paths, so the plurality of candidate paths may be evaluated and further ranked, based on the behavior data of other user when driving on the plurality of candidate paths. Therefore, in this operation it is further necessary to obtain the behavior data of the current user and the behavior data of at least one other user associated with each of the plurality of paths.

Note the technical solution according to the present invention needs to perform processing with respect to each of the plurality of paths one after another. Thereby in this disclosure a path being processed currently is referred to as a "current path" for the purpose of description.

In operation S406, a recommendation indicator associated with the current path is determined based on the behavior data of the user and the behavior data of the at least one other user. In this embodiment, the behavior data of the user is historical data describing the user's behavior during driving. Likewise, the behavior data of the at least one other user is historical data describing the at least one other user's behavior during driving.

Since the behavior data of the user can describe driving experience to some extent (e.g., frequent speedup and braking may represent bad driving experience), the behavior data of the user executing the query may be compared with the behavior data of other user associated with the candidate paths, so as to offer a high or low recommendation indicator with respect to each candidate path based on a comparison result.

For example, suppose the user's speedup and slowdown counts every 1 km during normal driving are 5 respectively, whereas it is found from statistics that other users' speedup and slowdown counts every 1 km when driving on a navigation path 1 are 10 respectively, then it may be considered intuitively that road conditions of navigation path 1 are poor (e.g., congested), a recommendation indicator of navigation path 1 may be set as a lower value; when it is found that other users' speedup and slowdown counts every 1 km when driving on a navigation path 2 are 2 respectively, it may be considered road conditions of navigation path 2 are good, so a recommendation indicator of navigation path 2 may be set as a higher value.

In the embodiments of the present invention, it is not limited how recommendation indicators are represented. For example, positive real numbers may represent recommendation indicators, wherein higher values represent higher recommendations and lower values represent lower recommendations; or recommendation indicators may be represented as real numbers, wherein positive numbers represent higher recommendations and negative numbers represent lower recommendations; or negative parameters like "risk level" may represent recommendations, at which point the higher a "risk level", the lower a recommendation; or those skilled in the art may further select other representation based on a concrete application environment.

In operation S408, it is judged whether there exist other more current paths; if yes, then the operation flow returns to operation S404; otherwise, the operation flow proceeds to operation S410.

In operation S410, the candidate path is recommended to the user based on at least a recommendation indicator associated with at least one of the plurality of paths. As a recommendation indicator with respect to each path among the plurality of paths has been obtained in operation S406, various candidate paths may be ranked in decreasing order by recommendation indicators.

Further, the technical solution of the present invention may be combined with an existing recommendation method. Suppose a recommendation order has been offered by distances of various navigation paths, then these navigation paths may be re-ranked based on the existing recommendation order in conjunction with recommendation indicators determined according to the method of the present invention.

Figure 5:
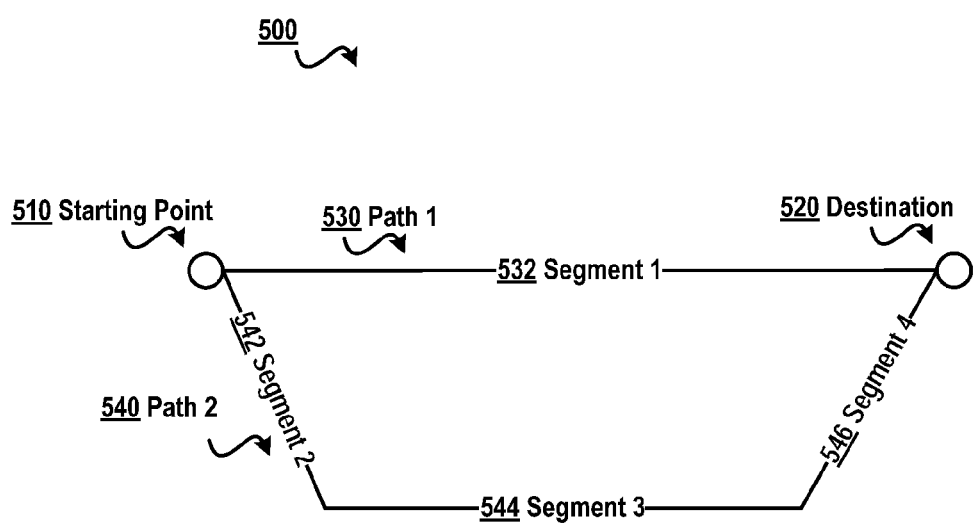
FIG. 5 shows a schematic view of dividing a path into segments according to one embodiment of the present invention.

In one embodiment of the present invention, a concept "segment" is introduced, which refers to a part between two turning points of a path. With reference to FIG. 5, description is presented now to the meaning of segment. FIG. 5 shows a schematic view of dividing a path into segments according to one embodiment of the present invention. As shown in this figure, suppose it is known a destination 520 can be reached from a starting point 510 via two paths (a path 1 530 and a path 2 540). As shown in this figure, path 1 530 is a straight road between starting point 510 and destination 520, so path 1 530 comprises only one segment (i.e., a segment 1 532). Path 2 540 comprises three segments, namely a segment 2 542, a segment 3 544 and a segment 4 546. In one embodiment of the present invention, locations like an intersection or a roundabout may be used as division points of segments. By dividing one path into one or more segments, the path may be represented at a finer granularity, and further behavior data associated with each segment of the path may be determined at the finer granularity.

Note in the context of the present invention, a location relationship between two turning points is not limited, but two turning points may be either adjacent or non-adjacent. As shown in FIG. 5, for example, segments 2 542 and 3 544 may jointly form one segment; further, segments 2 542, 3 544 and 4 546 may jointly form one segment.

In one embodiment of the present invention, the at least one other user is a user who has once driven on at least one part of the current path. Wherein the path is divided into a plurality of segments, users who have once driven on at least one segment of a path may be obtained, and possible driving experience on various segments may be estimated based on these users' behavior data, and further driving experience on the whole path may be estimated based on data associated with each segment, and then a recommendation indicator may be determined with respect to this segment.

Note in the embodiments of the present invention, it is never limited that only users who have once driven on each segments of the current path may be selected, but users who have once driven on at least one segment of the current path may be selected. Thereby, on the one hand the recommendation indicator may be determined at a finer granularity; on the other hand, an analysis may be made based on as many users' behavior data as possible, so as to weaken the impact of noise behavior data.

Further note data on segments on which the user has once driven may be saved. For example, the data may be saved in a list form. Specifically, data on segments which a user 1 has once gone through may be recorded as {segment 1, segment 2, segment 4, . . . }, while data on segments which a user 2 has once gone through may be recorded as {segment 2, segment 5, segment 7, . . . }. In this manner, by looking up segments which each user has once gone through, users who have once driven on at least one part of the current path may be obtained. Illustrated above is merely one concrete example for storing segments which the user has once gone through, and those skilled in the art may use other storage mode based on needs of an application environment, e.g., storing segments in conjunction with behavior data.

In one embodiment of the present invention, the user's behavior data describes behavior counts of the user during driving, and behaviors comprise at least one of: speedup information, slowdown information, overspeed information, and engine over rotation. Counts of various behaviors of the user may be recorded as behavior data. Specifically, Table 1 shows a schematic data structure for storing behavior data.

TABLE 1

Example 1 of Behavior Data

| User | Speedup | Slowdown | overspeed | ... |
|---|---|---|---|---|
| user 1 | 20 | 30 | 1 | ... |
| user 2 | 25 | 30 | 2 | ... |
| ... | ... | ... | ... | ... |

Those skilled in the art should note that Table 1 merely illustrates an example for storing behavior data, and they may further design other data structure based on needs of a concrete application environment. In order to record the user's behaviors on each segment more accurately, counts of various behaviors of the user on each segment may be recorded separately, at which point behavior data in Table 1 may be modified as Table 2.

TABLE 2

Example 2 of Behavior Data

| User | Segment | Speedup | Slowdown | overspeed | ... |
|---|---|---|---|---|---|
| user 1 | segment 1 | 2 | 3 | 1 | ... |
| user 2 | segment 1 | 3 | 4 | 0 | ... |
| user 3 | segment 2 | 3 | 1 | 0 | ... |
| ... | ... | ... | ... | ... | ... |

In one embodiment of the present invention, the determining a recommendation indicator associated with the current path based on the behavior data of the user and the behavior data of the at least one other user comprises: with respect to a current segment of at least one segment of the current path, determining a segment behavior parameter of the at least one other user in the current segment based on the behavior data of the at least one other user; determining a segment recommendation indicator associated with the current segment by comparing the behavior data of the user with the segment behavior parameter; and determining a recommendation indicator associated with the current path based on the segment recommendation indicator.

An introduction has been presented above to dividing the current path into a plurality of segments. Hereinafter, a detailed introduction is presented to how to determine a segment recommendation indicator associated with each segment on the basis of a single segment. Suppose with respect to segment 1, it is found from search that N users have once driven on segment 1, and various respects of the behavior data of these N users on segment 1 can be obtained from the data structure as shown in Table 2. In short, behavior data of each user may be summated, and the behavior data of these N users may be averaged. Then, the average value may be used as a segment behavior parameter of segment 1. Where behavior data comprises K dimensions, the determined segment behavior parameter is a K-dimensional vector.

Although one concrete example of determining the segment behavior parameter has been illustrated above in the form of averaging, those skilled in the art may further use other equation based on needs of a concrete application environment. For example, weighting may be conducted according to the importance of various dimensions in behavior. Specifically, suppose it is considered that overspeed is a serious behavior, then a higher weight (e.g., 2) may be assigned to this behavior; for another example, if it is considered that speedup is a conventional behavior, then a normal weight (e.g., 1) may be assigned to this behavior. In this manner, weights for various dimensions may be represented as a K-dimension vector.

Subsequently, a segment recommendation indicator associated with the current segment may be determined by comparing the user's behavior data with the segment behavior parameter. In one embodiment of the present invention, it is desired to find a segment having a lower segment behavior parameter. Thus, a higher segment recommendation indicator may be given to a segment with a lower segment behavior parameter, and in turn a recommendation indicator of a path including such a segment is also higher.

Where a segment recommendation indicator of each segment has been obtained, segment recommendation indicators of various segments may be summated so as to determine a recommendation indicator for the whole path. Or different weights may be assigned to various segment recommendation indicators based on the importance of various segments in the path.

In one embodiment of the present invention, the determining a segment behavior parameter of the at least one other user in the current segment based on the behavior data of the at least one other user comprises: clustering the at least one other user based on at least one of profile data and the behavior data of the at least one other user; weighting the behavior data of the at least one other user based on the clustering; and determining the segment behavior parameter based on weighted behavior data of the at least one other user.

Figure 6:
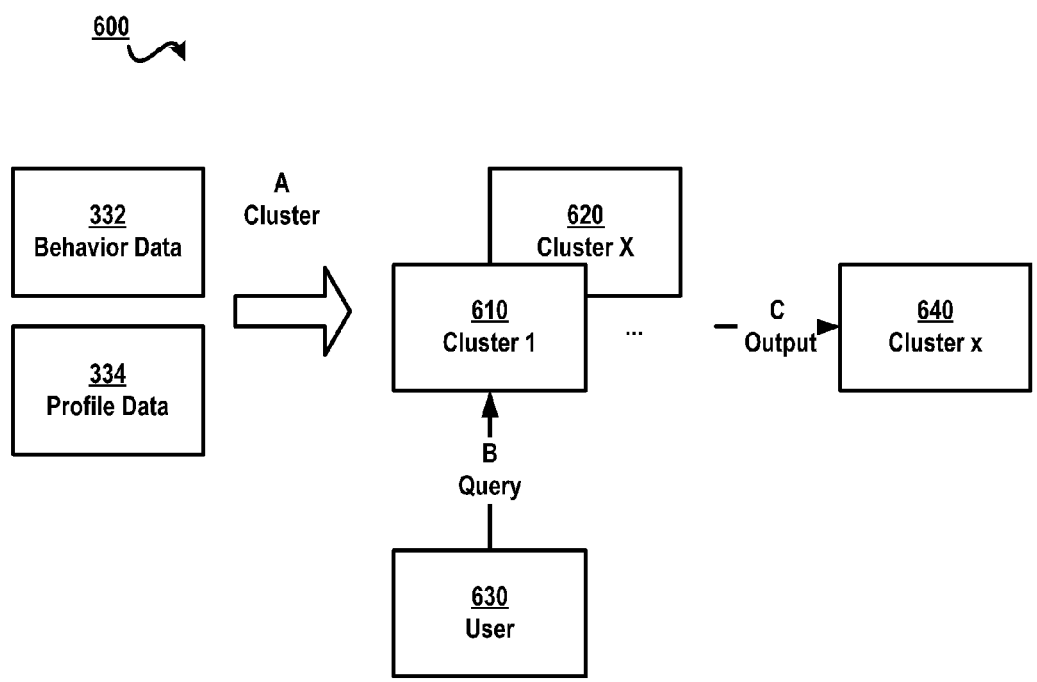
FIG. 6 shows a schematic view of the process of clustering users according to one embodiment of the present invention.

When determining a segment behavior parameter, the similarity between the user executing a query and a user who has once driven on a given segment may further be considered. Various respects of similarity may be compared. Briefly, different weights may be assigned to users of different clusters. FIG. 6 shows a schematic view 600 of the process of clustering users according to one embodiment of the present invention. As shown in this figure, users may be clustered based on at least one of behavior data 332 and profile data 334 stored in the user information repository (as shown by arrow A). In the context of the present invention it is not limited which clustering algorithm is used, but those skilled in the art may choose an appropriate algorithm according to needs of a concrete application environment, which is not detailed here.

After clustering, a plurality of users may be divided into different clusters (e.g., a cluster 1 610 to a cluster X 620). At this point, in order to obtain users having the similar background with a user 630 executing a query, it may be queried to which cluster user 630 belongs (as shown by arrow B), and subsequently a cluster x 640 to which user 630 belongs is outputted (as shown by arrow C). In this manner, subsequent operations may be performed based on information on the clustering.

For example, a higher weight may be assigned to a user belonging to the same cluster as the querying user, while a lower weight may be assigned to a user belonging to a different cluster than the querying user. By assigning different weights, more consideration may be given to the behavior data of users who are similar to the querying user.

As described above, the clustering may be implemented based on the behavior data, or on the profile data, or on both the behavior data and the profile data, so as to reflect the similarity in respects of the behavior data and the profile data.

In one embodiment of the present invention, suppose the candidate path comprises M segments, then a segment behavior parameter $seg_m$ with respect to a current segment m may be determined based on an equation below:

$$seg_m = \frac{1}{U} \sum_{i=1}^{U} \omega_i d_i \qquad \text{Equation 1}$$

Wherein U is the number of the at least one other user (i.e., users who have once driven on the segment m), $\omega_i$ is a weight with respect to the $i^{th}$ user of the at least one other user, and $d_i$ is behavior data of the $i^{th}$ user.

Note although the behavior data of the $i^{th}$ user is represented as $d_i$, as is clear from the foregoing disclosure, the behavior data $d_i$ may be in a K-dimensional vector form. Those skilled in the art may implement, by themselves, an equation when behavior data comprises K dimensions, which is not detailed here.

In one embodiment of the present invention, a segment recommendation indicator $Seg\ Rec_m$ associated with the segment is determined based on an equation below:

$$Seg\ Rec_m = \frac{d}{seg_m} - 1 \qquad \text{Equation 2}$$

Wherein d is the behavior data of the user. Here, the user's behavior data d is determined by a comparison, and the segment behavior parameter $seg_m$ is determined based on the behavior data of other user who has once driven on the segment. In the context of the present invention, since it is desired to find a better segment and the segment behavior parameter can describe to some extent whether the segment is good or bad, it may be ensured by the equation that the greater the segment behavior parameter $seg_m$, the smaller a value Seg $Rec_m$ (might be negative) of the segment recommendation indicator, at which point it is indicated the segment is not recommended. On the contrary, the smaller the segment behavior parameter $seg_m$, the less the number of behaviors which other user has taken on the segment (i.e., road conditions of the segment are good and suitable for driving), and the greater the value Seg $Rec_m$ (might be positive) of the segment recommendation indicator, which indicates the segment is recommended.

Note although a concrete equation for determining the segment recommendation indicator Seg $Rec_m$ has been presented above, those skilled in the art should understand this equation is merely one concrete example, and they may use other equation as a concrete application environment demands. For example, an equation Seg $Rec_m$=d−$seg_m$ may be used. At this point, when d>$seg_m$, the segment recommendation indicator Seg $Rec_m$ is positive, and when d<$seg_m$, the segment recommendation indicator Seg $Rec_m$ is negative; and the greater Seg $Rec_m$, the more the segment is recommended. For another example, an equation $$Seg\ Rec_m = \frac{seg_m}{d} - 1$$

or Seg $Rec_m$, Seg $Rec_m$=$seg_m$−d may be used; at this point, the greater Seg $Rec_m$, the less the segment is recommended.

Illustration has been presented above to how to determine the segment recommendation indicator Seg $Rec_m$ of each segment in the candidate path. In the context of the present invention, what is to be recommended to the user is a path from a starting point to a destination rather than a segment. Therefore, segment recommendation indicators Seg $Rec_m$ for various segments in the path need to be summated, so as to consider as a whole whether the path is recommended or not.

In one embodiment of the present invention, the determining a recommendation indicator PathRec associated with the current path based on the segment recommendation indicator comprises:

$$PathRec = \sum_{m=1}^{M} Seg\ Rec_m \qquad \text{Equation 3}$$

Wherein M represents the number of segments in the current path. In this equation, based on Equation 1 may be summated, so as to obtain a recommendation indicator PathRec with respect to each path.

In one embodiment of the present invention, since multiple segments in one path might have different importance, a weight may be assigned to each segment. Therefore, Equation 3 may be expanded as below:

$$PathRec = \sum_{m=1}^{M} u_m Seg\ Rec_m \qquad \text{Equation 4}$$

Wherein M represents the number of segments in the current path, and $u_m$ represents a weight with respect to the $m^{th}$ segment in the current path. For example, suppose in the path segment 1 is 1 km long and segment 2 is 3 km long, then weights 1 and 3 may be assigned to paths 1 and 3, respectively. Or those skilled in the art may use other approach to setting concrete values of weights.

Since the user's behavior data may comprise K respects (e.g., speedup information, slowdown information, over-speed information, and engine over rotation), when using Equations 1 to 4 based on the user's behavior data, a value determined based on behavior data may be an K-dimensional vector. At this point, in order to differentiate between importance of different dimensions in data, different weights may be set with respect to different dimensions.

For example, suppose a result determined in a operation is a vector $(v_1, v_2, \ldots, v_k, \ldots, v_K)$, and a weight with respect to each dimension is $$\begin{pmatrix} w_1 \\ w_2 \\ \ldots \\ w_k \\ \ldots \\ w_K \end{pmatrix},$$

then a weighted result may be $$Result = (v_1, v_2, \ldots, v_k, \ldots, v_K) \cdot \begin{pmatrix} w_1 \\ w_2 \\ \ldots \\ w_k \\ \ldots \\ w_K \end{pmatrix}.$$

In one embodiment of the present invention, the recommending the candidate path to the user based on at least a recommendation indicator associated with at least one of the plurality of paths comprises: obtaining a base priority score associated with at least one of the plurality of paths; recommending the candidate path to the user based on the base priority score associated with at least one of the plurality of paths and a recommendation indicator associated with at least one of the plurality of paths.

By means of the technical solution of the present invention, it may be provided to the user a path better conforming to himself/herself where the existing path recommendation technique is changed as little as possible. Therefore, in one embodiment of the present invention, a base priority score of each path may be obtained based on the existing path recommendation path, and subsequently the candidate path is recommended to the user jointly based on the base priority score and the recommendation indicator obtained based on the present invention.

Specifically, suppose there are N paths satisfying the user's query, a base priority score with respect to the $n^{th}$ path among the N paths is $BaseScore_n$, and a recommendation indicator with respect to the $n^{th}$ path as obtained based on the method of the present invention is $PathRec_n$, then a comprehensive priority score with respect to the $n^{th}$ path may be determined based on Equation 5 below:

$$Score_n = \alpha * BaseScore_n + \beta * PathRec_n \qquad \text{Equation 5}$$

Wherein α and β are weights with respect to the base priority score $BaseScore_n$ and the recommendation indicator $PathRec_n$ respectively. When they are considered to be equally important, it may be set α=β=0.5; when the recommendation indicator is considered to be more important, it may be set α=0.1, β=0.9, for example.

In one embodiment of the present invention, context data of the at least one other user is similar to context data of the user, wherein the context data comprises at least one of: time information, road information, traffic information, weather information, and vehicle type.

Since the context confronting each user during driving might differ somewhat, the behavior data of users who have once driven on the candidate path and who have the similar context data with the querying user may be used, in order to more accurately recommend a road suitable for the current context of the querying user. Specifically, if the user's current context is (time: 10:00 PM, weather: storm), then when searching for users who have once driven on the first candidate path in the user information repository, only users who have once driven through the candidate path on a stormy night may be selected, and subsequent processing is performed based on information of these users. By taking context data into consideration, a path conforming to the user situation may be provided to the user pertinently.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing operations in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding operations. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 7:
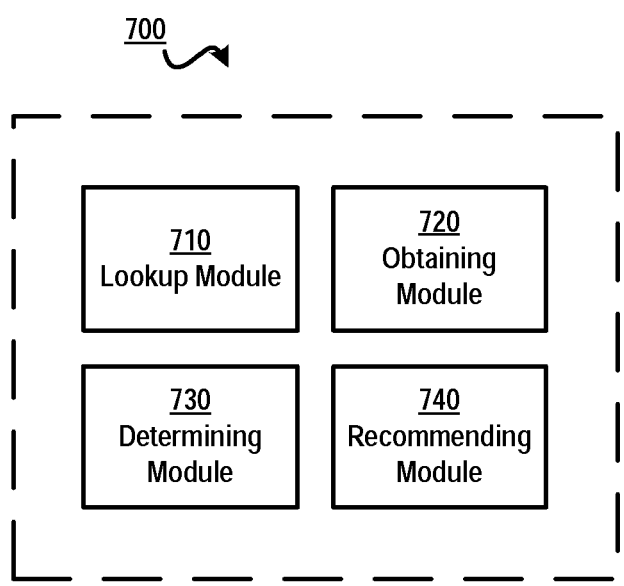
FIG. 7 schematically shows a block diagram of an apparatus for recommending a candidate path based on the behavior data of a user according to one embodiment of the present invention.

FIG. 7 shows a block diagram 700 of an apparatus for recommending a candidate path based on behavior data of a user according to one embodiment of the present invention. Specifically, there is provided an apparatus for recommending a candidate path, comprising: a lookup module 710 configured to, in response to receiving a query from a user, look up a plurality of paths that conform to the query; an obtaining module 720 configured to, with respect to a current path among the plurality of paths, obtain behavior data of the user and behavior data of at least one other user associated with the current path; a determining module 730 configured to determine a recommendation indicator associated with the current path, based on the behavior data of the user and the behavior data of the at least one other user; and a recommending module 740 configured to recommend the candidate path to the user based on at least a recommendation indicator associated with at least one of the plurality of paths.

In one embodiment of the present invention, the at least one other user is a user who has once driven on at least one part of the current path.

In one embodiment of the present invention, determining module 730 comprises: a first determining module configured to, with respect to a current segment of at least one segment of the current path, determine a segment behavior parameter of the at least one other user in the current segment based on the behavior data of the at least one other user; a second determining module configured to determine a segment recommendation indicator associated with the current segment by comparing the behavior data of the user with the segment behavior parameter; and a third determining module configured to determine a recommendation indicator associated with the current path based on the segment recommendation indicator.

In one embodiment of the present invention, the first determining module comprises: a clustering module configured to cluster the at least one other user based on at least one of profile data and the behavior data of the at least one other user; a weighting module configured to weight the behavior data of the at least one other user based on the clustering; and a parameter determining module configured to determine the segment behavior parameter based on the weighted behavior data of the at least one other user.

In one embodiment of the present invention, a segment behavior parameter $seg_m$ with respect to a current segment m is determined based on an equation:

$$seg_m = \frac{1}{U}\sum_{i=1}^{U} \omega_i d_i,$$

wherein U is the number of the at least one other user, $\omega_i$ is a weight with respect to the $i^{th}$ user of the at least one other user, and $d_i$ is behavior data of the $i^{th}$ user.

In one embodiment of the present invention, a segment recommendation indicator $Seg\ Rec_m$ associated with the segment is determined based on an equation:

$$Seg\ Rec_m = \frac{d}{seg_m} - 1,$$

wherein d is the behavior data of the user.

In one embodiment of the present invention, a recommendation indicator Path Rec associated with the current path is determined based on an equation: $PathRec = \sum_{m=1}^{M} Seg\ Rec_m$, wherein M represents the number of segments in the current path.

In one embodiment of the present invention, recommending module 740 comprises: a base score obtaining module configured to obtain a base priority score associated with at least one of the plurality of paths; a comprehensive recommending module configured to recommend the candidate path to the user based on the base priority score associated with at least one of the plurality of paths and a recommendation indicator associated with the at least one of the plurality of paths.

In one embodiment of the present invention, context data of the at least one other user is similar to context data of the user, wherein the context data comprises at least one of: time information, road information, traffic information, weather information, and vehicle type.

In one embodiment of the present invention, the behavior data of the user describes counts of behaviors of the user during driving, and the behaviors comprise at least one of: speedup information, slowdown information, overspeed behavior, and engine over rotation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus for recommending a candidate path, comprising:
a lookup module configured to, in response to receiving a query from a user, look up a plurality of paths in a networked vehicle user database that conform to the query;
an obtaining module configured to, with respect to a current path among the plurality of paths, obtain behavior data of the user and behavior data of at least one other user associated with the current path;
a determining module configured to determine a recommendation indicator associated with the current path, based on the behavior data of the user and the behavior data of the at least one other user; and
a recommending module configured to recommend the candidate path to the user on a display based on at least a recommendation indicator associated with at least one of the plurality of paths;
wherein the determining module comprises:
a first determining module configured to, with respect to a current segment of at least one segment of the current path, determine a segment behavior parameter of the at least one other user in the current segment based on the behavior data of the at least one other user;
a second determining module configured to determine a segment recommendation indicator associated with the current segment by comparing the behavior data of the user with the segment behavior parameter; and
a third determining module configured to determine a recommendation indicator associated with the current path based on the segment recommendation indicator.

2. The apparatus of claim 1, wherein the at least one other user is a user who has once driven on at least one part of the current path.

3. The apparatus of claim 1, wherein the first determining module comprises:
a clustering module configured to cluster the at least one other user based on at least one of profile data and the behavior data of the at least one other user;
a weighting module configured to weight the behavior data of the at least one other user based on the clustering; and
a parameter determining module configured to determine the segment behavior parameter based on the weighted behavior data of the at least one other user.

4. The apparatus of claim 3, wherein a segment behavior parameter $seg_m$ with respect to the current segment m is determined based on the equation:

$$seg_m = \frac{1}{U}\sum_{i=1}^{U} \omega_i d_i,$$

wherein U is the number of the at least one other user, $\omega_i$ is a weight with respect to the $i^{th}$ user of the at least one other user, and $d_i$ is behavior data of the $i^{th}$ user.

5. The method of claim 4, wherein a segment recommendation indicator $Seg\ Rec_m$ associated with the segment is determined based on the equation:

$$Seg\ Rec_m = \frac{d}{seg_m} - 1,$$

wherein d is the behavior data of the user.

6. The apparatus of claim 5, wherein a recommendation indicator Path Re c associated with the current path is determined based on the equation:
PathRec=$\Sigma_{m=1}^{M}$ Seg Re $c_m$, wherein M represents the number of segments in the current path.

7. The apparatus of claim 1, wherein the recommending module comprises:
a base score obtaining module configured to obtain a base priority score associated with at least one of the plurality of paths;
a comprehensive recommending module configured to recommend the candidate path to the user based on the base priority score associated with at least one of the plurality of paths and a recommendation indicator associated with the at least one of the plurality of paths.

8. The apparatus of claim 1, wherein context data of the at least one other user is similar to context data of the user, wherein the context data comprises at least one of: time information, road information, traffic information, weather information, and vehicle type.

9. The apparatus of claim 1, wherein the behavior data of the user describes counts of behaviors of the user during driving, and the behaviors comprise at least one of: speedup information, slowdown information, overspeed behavior, and engine over rotation.

* * * * *